Jan. 26, 1937.  R. G. GRISWOLD  2,069,161
GAS TRANSPORTATION SYSTEM
Filed Dec. 3, 1932
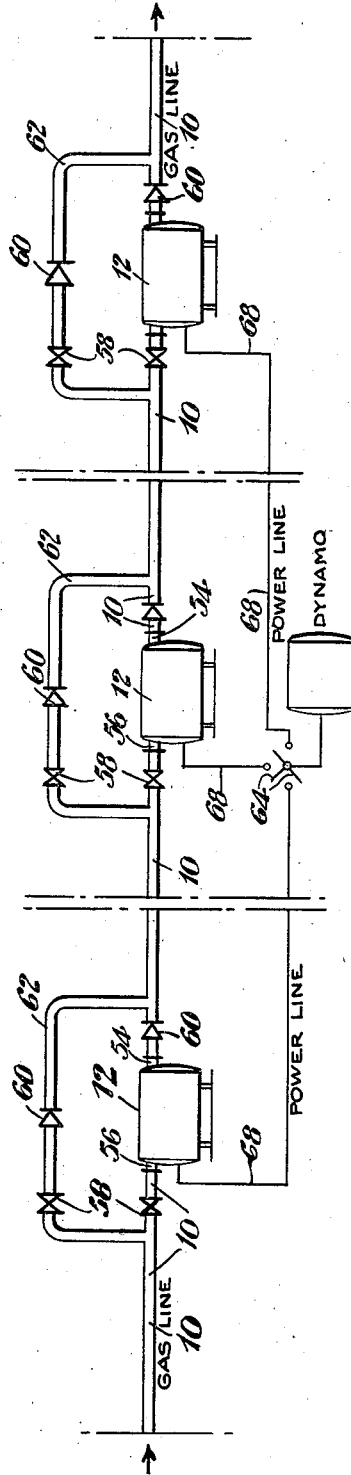
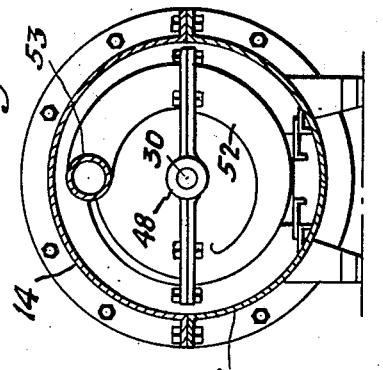
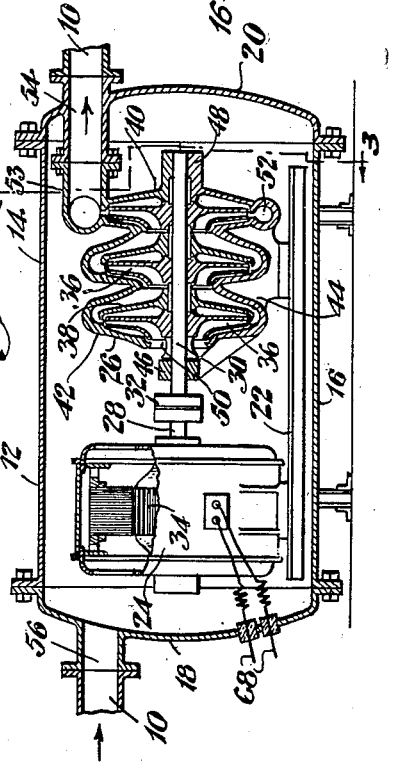
INVENTOR
ROBERT G. GRISWOLD
BY
ATTORNEY Patented Jan. 26, 1937

2,069,161

UNITED STATES PATENT OFFICE 2,069,161

GAS TRANSPORTATION SYSTEM

Robert G. Griswold, Westfield, N. J., assignor to Doherty Research Company, New York, N. Y., a corporation of Delaware Application December 3, 1932, Serial No. 645,635

3 Claims. (Cl. 48—190)

This invention relates to the art of impelling gases through long distance pipe lines and more particularly to a method and means for economically effecting periodic boosting of pressure of gas carried by pipelines without leakage. The invention was originally described in my copending application Serial No. 530,836 filed April 17, 1931, of which this application is a continuation in part.

It is an object of this invention to provide for the efficient flow of gases through long distance lines such as are used for the transmission of natural gas, by maintaining the pressure throughout the same more uniform and nearer to the most efficient pressure than has heretofore been possible.

To this end it is a feature of this invention to provide impelling units at more frequent intervals along the line than has heretofore been economically practicable thereby avoiding great pressure drops between units and maintaining the pressure throughout the line more uniform.

It is a further object of this invention to reduce the initial cost of long distance pipeline constructions.

To this end it is a feature of this invention to eliminate the usual compressor stations involving a substantial building and expensive equipment and substituting therefor centrifugal compressor units with direct coupled electric motor drive completely housed in the pipeline itself.

It is a further object of this invention to reduce the operating and maintenance costs of such lines.

To this end it is a feature of this invention to provide motor-compressor units susceptible of remote control, having few parts liable to get out of order, and therefore not requiring the continual presence of an attendant.

It is a further object of this invention to reduce the leakage of gas from high pressure compressor units.

To this end a feature of this invention is to provide a construction in which the necessity for stuffing boxes and the like is avoided, and in which no reciprocating or rotating parts extend through the motor-compressor housing.

These and other objects and advantages of the invention will be more apparent to those skilled in the art from a consideration of the following detailed description taken in conjunction with the accompanying drawing, in which—

Fig. 1 is a diagrammatic view illustrating the preferred spacing and arrangement of motor-compressor units built in as an integral part of a long distance gas transportation pipeline;

Fig. 2 shows a longitudinal section taken through one of the motor-compressor units shown in Fig. 1, constructed in accordance with this invention and showing parts in side elevation;

Fig. 3 is a transverse section taken on line 3—3 of Fig. 2.

Referring to the drawing, Fig. 1 illustrates an adaptation of several spaced pumping units, in accordance with the present invention, to a gas pipeline 10 transporting gas under several hundred pounds pressure. Assume, for example, that Fig. 1 illustrates a ninety mile section of the line 10, with motor-compressor units mounted within enlarged housing sections 12 of the line at substantially equally spaced distances of say thirty miles. As shown in Fig. 2, each housing 12 is composed of two semi-cylindrical members 14 and 16, detachably united by gastight joints to form a hollow cylindrical casing, the ends of which are sealed by suitable covers 18 and 20. Within the housing 12 is a supporting structure 22, readily attached to the lower cylindrical member 16, and supporting an electric motor 24 and turbo-compressor 26. The motor and compressor are disposed with their shafts 28 and 30 in axial alignment so that the same may be directly coupled by a coupling 32. The motor 24 is of conventional construction save that the rotating parts thereof are made as smooth as practicable to avoid high windage losses. This is necessary since the gases surrounding and circulating through the motor are at high pressure, that is to say around 400 pounds per square inch, and offer proportionally greater resistance than gases at atmospheric pressure. The heat capacity of gases at high pressure is proportionally greater than that of gases at low pressure and therefore less provision need be made for cooling. It follows therefore that by making the windings of the armature 34, where this is the rotating element, relatively smooth, windage losses will remain comparable to those of motors functioning under atmospheric conditions while sufficient cooling will still be provided.

The compressor 26 is of known design, having the usual impellers 36 mounted to rotate with the shaft 28 and having stationary directing vanes 38 which coact with the walls of the compressor casing 40 to deliver gas from one stage to the nearest succeeding stage. For convenience in assembly, the compressor casing 40 is formed of an upper half 42, and a lower half 44, detachably united by any well known means such as bolts, the lower half 44 being attached to supporting structure 22. Journals 46 and 48, the latter of which is formed between the two halves of the casing 40, are provided adjacent the ends of shaft 30.

Admission of gases to the compressor is afforded by an open intake 50 provided at one end of the casing 40 and so disposed as to deliver gas at right angles to the axis of rotation of the first of the impellers 36, and adjacent the center thereof, while the discharge of gases from the last impeller is collected by a scroll 52 surrounding the periphery thereof. The scroll 52 terminates in a discharge connection 53 which is detachably united with a discharge coupling 54 formed integral with the end cover 20. The outside end of the coupling 54 is attached to a section of the pipeline 10. Admission of gases to the casing 40 is afforded by a coupling 56 formed and integral with the cover 16 and which is attached to a section of the pipeline 10. It will be understood that the line is provided with the usual throttle valves 58 and check valves 60 and bypass connections 62 to permit the units to be cut out.

The device as disclosed may conveniently be examined or repaired by removing only the upper half 14 of the casing 12 and when this is done both the motor and compressor are readily accessible and either or both may be easily removed.

The operation of this construction will be readily apparent, it being obvious that when the intake coupling 56 is connected to the pipeline 10 the entire interior of the housing 12 is subjected to the pressure of the gases in this part of the line. These gases enter the turbo-compressor through the intake 50, where the pressure is boosted from the 400 pounds obtaining in housing 12 to about 600 pounds, and the gases are then discharged into the line 10 through coupling 54. It will be seen that in this construction the exterior of the casing 40 of the turbo-compressor is exposed to the gas and the pressure within the housing 12 and it is therefore only necessary that the casing be strong enough to sustain the difference between the pressure to which the gases are boosted, and the pressure of the gases within the housing 12. Leakage through the joint between the upper and lower halves of the compressor casing 40 is less likely to occur than if the same were subjected to the full difference between the pressure therein and atmospheric pressure and even in the event that leakage does occur at this point the escaping gas is not lost to atmosphere.

No parts of the compressor unit are subjected to a pressure corresponding to the full difference between atmospheric pressure and the pressure to which the gases are boosted. Furthermore, by this arrangement the stuffing boxes, which would otherwise be essential were the motor disposed on the outside of the housing 12, are dispensed with and leakage at such points is entirely eliminated together with the necessity for the frequent renewal of the stuffing box packing.

It will be understood that a number of these units may be disposed along the pipeline at relatively frequent intervals (see Fig. 1) and that all may be remotely controlled as from motor operated master switches 64 located at a single generating station 66 supplying current to the motors 24 through a power line 68.

A number of units may therefore be serviced by a single attendant and it becomes practical to dispose the units at relatively frequent intervals in the line so that the pressure drop between units is small, without increasing the cost of maintenance over that of conventional lines.

It is to be understood that the invention is not limited to the use of an electric motor for driving the turbo-compressor. On the contrary, a steam turbine, rotary gas turbine or other motor adapted to be suitably enclosed in the housing may be substituted for the electric motor mentioned in connection with a specific embodiment of the invention.

Although there is herein disclosed but a single preferred embodiment of the invention it will be understood that the same is capable of many modifications within the scope of the appended claims.

Having thus described the invention, I claim:

1. In combination with a long distance gas transporting conduit adapted to carry large volumes of natural gas under several hundred pounds pressure, means for maintaining the gas throughout the length of the conduit under a relatively high pressure by boosting its pressure at spaced points along the conduit, said means comprising a plurality of compressors operatively and completely enclosed within said conduit at spaced points intermediate its ends, and electric motor driving elements directly coupled to each of said compressors and housed within said conduit.

2. A method of transporting combustible gas long distances through a conduit, which method comprises introducing said gas into the conduit under a pressure of several hundred pounds per square inch, preventing large pressure drops through the conduit by boosting the gas pressure at spaced points along the length of the conduit, and operating an electric motor and fan installation to power such boosting operation in said conduit and in the athosphere of the gases in the conduit.

3. The method of transporting large volumes of combustible gas long distances through a conduit comprising, introducing such gas into the inlet end of said conduit under a pressure of several hundred pounds per square inch, maintaining the gas throughout the length of the conduit under a relatively high pressure by contacting it at spaced points along the conduit with centrifugal impellers whereby its pressure is boosted, generating electrical energy at a centrally-located point, using such generated electricity for operating an electric motor in conjunction with said centrifugal impellers in the atmosphere of the gases within the conduit to effect such boosting operation, and remotely controlling from said central generating point the pressure boosting operations at a plurality of points along said conduit.

ROBERT G. GRISWOLD.